(12) United States Patent
Lam et al.

(10) Patent No.: US 10,574,098 B2
(45) Date of Patent: Feb. 25, 2020

(54) STATOR, MOTOR COMPRISING THE SAME AND METHOD FOR MAKING THE SAME

(71) Applicant: Johnson Electric S.A., Murten (CH)

(72) Inventors: Kar Wai Lam, Hong Kong (CN); Yi Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 318 days.

(21) Appl. No.: 15/452,289

(22) Filed: Mar. 7, 2017

(65) Prior Publication Data

US 2017/0256995 A1    Sep. 7, 2017

(30) Foreign Application Priority Data

Mar. 7, 2016 (CN) .......................... 2016 1 0127858
Mar. 7, 2016 (CN) .......................... 2016 1 0127907

(51) Int. Cl.
| | |
|---|---|
| *H02K 1/14* | (2006.01) |
| *H02K 5/22* | (2006.01) |
| *H02K 15/02* | (2006.01) |
| *H02K 9/06* | (2006.01) |
| *H02K 11/215* | (2016.01) |
| *H02K 5/20* | (2006.01) |
| *H02K 7/08* | (2006.01) |
| *H02K 3/52* | (2006.01) |

(52) U.S. Cl.
CPC ............. *H02K 1/146* (2013.01); *H02K 1/148* (2013.01); *H02K 3/522* (2013.01); *H02K 5/20* (2013.01); *H02K 5/225* (2013.01); *H02K 7/08* (2013.01); *H02K 9/06* (2013.01); *H02K 11/215* (2016.01); *H02K 15/022* (2013.01); *H02K 2203/12* (2013.01)

(58) Field of Classification Search
CPC ........ H02K 3/522; H02K 9/06; H02K 11/215; H02K 15/022; H02K 1/146; H02K 1/148; H02K 2203/12; H02K 5/20; H02K 5/225; H02K 7/08; H02K 11/00; H02K 15/026; H02K 1/143; H02K 1/165; H02K 1/185; H02K 1/20; H02K 3/521
USPC .......................................................... 310/43
See application file for complete search history.

(56) References Cited

U.S. PATENT DOCUMENTS

| | | | |
|---|---|---|---|
| 6,201,324 B1 * | 3/2001 | Suzuki ................... | H02K 1/145 29/596 |
| 6,992,419 B2 * | 1/2006 | Kim ...................... | D06F 37/304 310/266 |

(Continued)

FOREIGN PATENT DOCUMENTS

CN             203352408 U        12/2013

*Primary Examiner* — Alex W Mok
(74) *Attorney, Agent, or Firm* — Muncy, Geissler, Olds & Lowe, P.C.

(57) ABSTRACT

A motor stator includes a stator core and a number of stator windings. The stator core includes a stator yoke and a plurality of stator tooth wrapped by a bobbin formed with an over-molding process, and further correspondingly wound around by stator windings. The stator teeth are connected to an inner surface of the stator yoke. A motor including the above motor stator and a rotor is also provided. The rotor includes a rotor core and a rotary shaft fixed relative to the rotor core. The rotor core is received in the bobbin and in magnetic coupling with the stator teeth.

19 Claims, 9 Drawing Sheets

(56) References Cited

U.S. PATENT DOCUMENTS

| | | | |
|---|---|---|---|
| 2004/0189136 A1* | 9/2004 | Kolomeitsev | H02K 1/148 310/216.082 |
| 2007/0247009 A1* | 10/2007 | Hoffman | F04D 25/0606 310/51 |
| 2007/0252447 A1* | 11/2007 | Ionel | H02K 1/148 310/44 |
| 2008/0054735 A1 | 3/2008 | Yoshida et al. | |
| 2008/0136287 A1* | 6/2008 | Lee | H02K 1/148 310/216.064 |
| 2010/0141059 A1* | 6/2010 | Nishimura | H02K 1/02 310/44 |
| 2012/0098381 A1* | 4/2012 | Seki | H02K 1/148 310/215 |
| 2012/0223600 A1* | 9/2012 | Tonogi | H02K 1/148 310/46 |
| 2014/0042866 A1* | 2/2014 | Zhao | H02K 1/148 310/216.007 |
| 2014/0117807 A1* | 5/2014 | Kim | H02K 1/24 310/216.092 |
| 2015/0054377 A1* | 2/2015 | Kameyama | H02K 1/148 310/215 |
| 2015/0280526 A1* | 10/2015 | Chamberlin | H02K 9/22 310/54 |
| 2015/0318771 A1* | 11/2015 | Oh | H02K 5/1672 29/598 |
| 2015/0381022 A1* | 12/2015 | Major | H02K 15/12 310/45 |
| 2016/0020659 A1* | 1/2016 | Takahashi | H02K 1/146 417/410.4 |
| 2016/0344271 A1* | 11/2016 | Li | H02K 21/025 |

\* cited by examiner

STATOR, MOTOR COMPRISING THE SAME AND METHOD FOR MAKING THE SAME

CROSS REFERENCE TO RELATED APPLICATIONS

This non-provisional patent application claims priority under 35 U.S.C. § 119(a) from Patent Applications No. 201610127907.3 and No. 201610127858.3 filed in The People's Republic of China on Mar. 7, 2016.

FIELD OF THE INVENTION

This invention relates to motors, and in particular to a stator of a motor, a motor having the stator, and a method for making the stator.

BACKGROUND OF THE INVENTION

Motors are devices for converting electrical energy into mechanical energy, which have been widely used in various industries. In general, a motor includes a rotor and a stator. Magnetic fields of the rotor and the stator interact with each other to drive the rotor to rotate relative to the stator. The stator of the motor such as a brushless motor includes a stator core and stator windings. The stator core includes a yoke and a plurality of tooth bodies extending inwardly from the yoke, with a winding slot formed between each two adjacent tooth bodies. The stator windings are wound around the tooth bodies and received in the winding slots.

The stator windings wound around the stator core need to be insulated from the stator core. In some existing motors, the stator windings are wound around the tooth bodies of the stator core coated with insulating paint, such that the stator windings and the stator core are insulated from each other through the insulating paint. However, this type of motors not only has the risk of direct contact between the stator windings and the stator core, but it also has a low winding efficiency because each tooth body needs to be wound separately. In some other existing motors, stator windings are wound around two winding brackets that are attached to two ends of the stator core, thereby avoiding the direction contact between the stator windings and the stator core. However, assembly of this type of motors is complicated, which leads to low assembly efficiency.

SUMMARY OF THE INVENTION

Accordingly, there is a need for a stator with enhanced winding efficiency that can be more conveniently fabricated, and a motor having the stator.

In one aspect, a motor stator is provided which includes a stator core and a plurality of stator windings wound around the stator core. The stator core includes a ring-like stator yoke and a plurality of stator teeth connected to an inner surface of the stator yoke. The stator further includes a bobbin. The wrapping the stator teeth with an over-molding process. The stator windings wound around the stator teeth of the stator core via the bobbin.

Preferably, the bobbin includes a cylindrical portion and a plurality of winding blocks, each sleeving on a correspondingly one of the stator teeth, the winding blocks extend from an outer side of the cylindrical portion, each of the stator teeth includes a tooth body and a pole shoe connected to one end of the tooth body opposite from the stator yoke, each of the stator windings is wound around a corresponding one of the winding blocks.

Preferably, each of the pole shoes has a structure asymmetric about a corresponding tooth body, one side of the pole shoe opposite from the corresponding tooth body defines a positioning groove, and the stator is used in a single-phase brushless motor.

Preferably, the cylindrical portion and the winding blocks of the bobbin are integrally formed, and the stator teeth are connected into an integrated unit through the bobbin.

Preferably, the bobbin further includes a bottom portion connected to one end of the cylindrical portion, a receiving chamber is formed in a center of the bottom portion, and a bearing is mounted in the receiving chamber.

Preferably, the bobbin further includes a position-limiting plate disposed at one end of each of the winding blocks away from the cylindrical portion, two ends of the position-limiting plate both protrude out of the winding block, and each end of the position-limiting plate, the winding block and the cylindrical portion cooperatively cooperatively bounding a winding slot for a corresponding one of windings.

Preferably, each of the stator teeth has a lamination-stacking structure.

Preferably, the stator yoke is formed by stacking a plurality of core laminations along an axial direction of the stator.

Preferably, an inner surface of the stator yoke defines a plurality of first engaging slots, each of the first engaging slot passes through two opposite ends of stator yoke along an axial direction of the stator yoke, each of the stator teeth includes an engaging projection disposed at one end of the tooth body opposite from the pole shoe, and each of the engaging projections engages in a corresponding one of the first engaging slots.

Preferably, the stator further includes a mounting bracket, an annular groove is defined in a circumferential side of the mounting bracket configured to receiving the stator yoke, one of opposite axial end of the mounting bracket defines a plurality guiding notches in communication with the annular groove, and respectively aligning with the first engaging slot to enable each of the engaging projections passes through one corresponding guiding notch to engage in one corresponding first engaging slot.

Preferably, a plurality of receiving slots is defined in a circumferential wall bounding the annular groove, to respectively communicating with the guiding notches, the bobbin further comprises a position-limiting plate disposed at one side of each of the winding blocks away from the cylindrical portion, and each position-limiting plate is received in one corresponding receiving slot.

Preferably, the stator further includes an end cap, the end cap includes a bottom plate and a sidewall, and the end cap is connected to an end of the mounting bracket, a bearing is mounted to the bottom plate of the end cap.

Preferably, the mounting bracket includes a latching portion, a hook is formed at a distal end of the latching portion, the sidewall of the end cap defines a receiving groove to receive the latching portion and a locking hole in communication with the receiving groove and configured to engage with hook.

Preferably, the bottom plate of the end cap defines a plurality of ventilation holes.

Preferably, a PCB is mounted in the end cap and fixed to an inner side of the bottom plate of the end cap.

Preferably, the stator further includes a mounting bracket, the mounting bracket comprises an mounting portion wrapping the stator yoke with an over-molding process and a receiving portion is integrally formed with and extending from one of opposite axial ends of the mounting portion, a bearing and a PCB is mounted in the receiving portion.

Preferably, an annular groove is defined in a circumferential side of the mounting portion configured to receiving the stator yoke, the other one of the opposite axial ends of the mounting portion of the mounting bracket defines a plurality guiding notches in communication with the annular groove, and respectively aligning with the first engaging slot to enable each of the engaging projections passes through one corresponding guiding notch to engage in one corresponding first engaging slot.

Preferably, the stator further includes a plurality of terminals attached to an end of the cylindrical portion, and configured to electrically connecting with corresponding stator windings.

Preferably, the end of the cylindrical portion to which the terminals is attached forms a plurality of circumferentially spaced protrusions, Each of the terminals are engaged between adjacent protrusions.

In another aspect, a motor is provided which includes any of the motor stators described above. The motor further includes a rotor. The rotor includes a rotor core and a rotary shaft fixed relative to the rotor core. The rotor core is received in the bobbin and in magnetic coupling with the stator teeth.

Preferably, the rotor further comprises an impeller connected with one end of the rotary shaft, and the impeller includes a plate plurality of vanes depending on one side of the plate facing the stator.

In still another aspect, a method for making a stator is provided which includes:
  providing a plurality of stator teeth;
  forming a bobbin warping the stator teeth using an over-molding process; and
  winding stator windings around the stator teeth via the bobbin.

Preferably, providing a plurality of stator teeth comprises stacking a plurality of core laminations along an axial direction of the stator.

Preferably, forming the bobbin comprises placing the plurality of stator teeth in a same injecting mold and injecting resin into the mold.

Preferably, the method further includes:
  providing a stator yoke;
  forming a mounting bracket warping the stator yoke using an over-molding process; and
  assembling the plurality of stator teeth to the stator yoke.

Preferably, providing a stator yoke comprises stacking a plurality of core laminations along an axial direction of the stator.

Preferably, assembling the plurality of stator teeth to the stator yoke comprising connecting the stator teeth and the stator yoke with dovetail joints.

Figure 1:
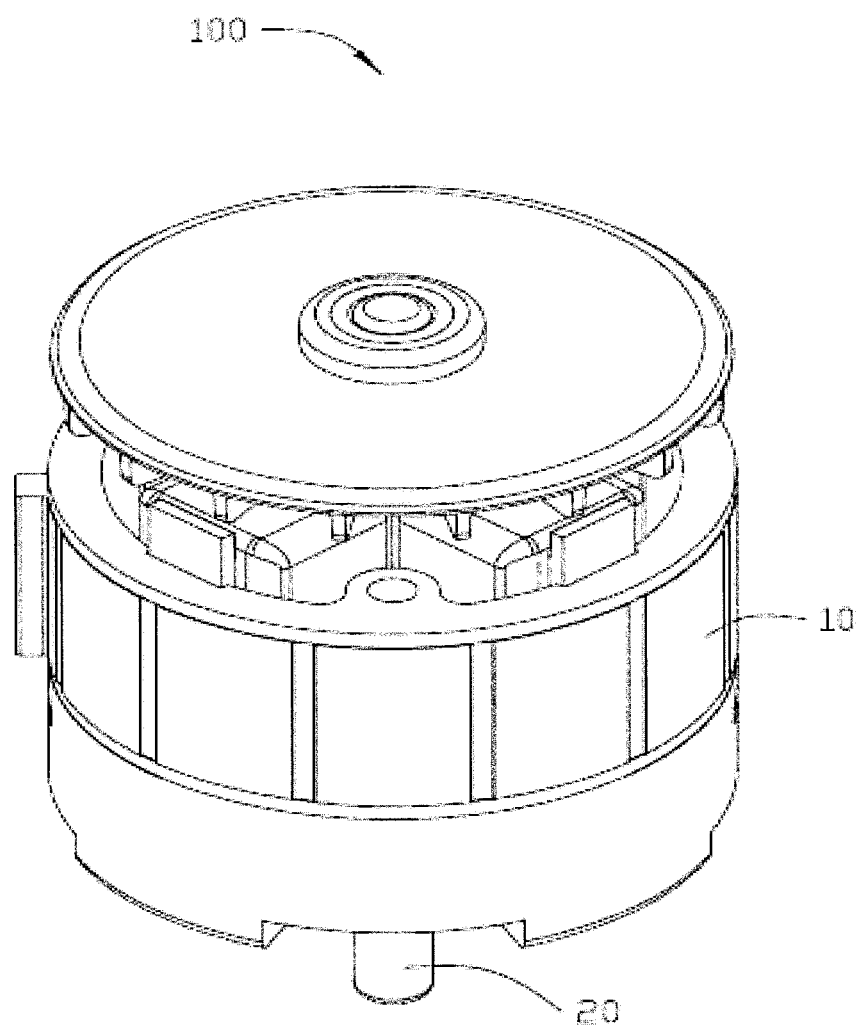
FIG. 1 is a perspective view of a motor according to a first embodiment of the present invention.

Description of reference numerals of main components

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component, i.e. indirectly fixed to the another component through a third component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Referring to FIG. 1, a motor 100 in accordance with a first embodiment of the present invention includes a stator 10 and a rotor 20. The rotor 20 is rotatably mounted in the stator 10.

Figure 2:
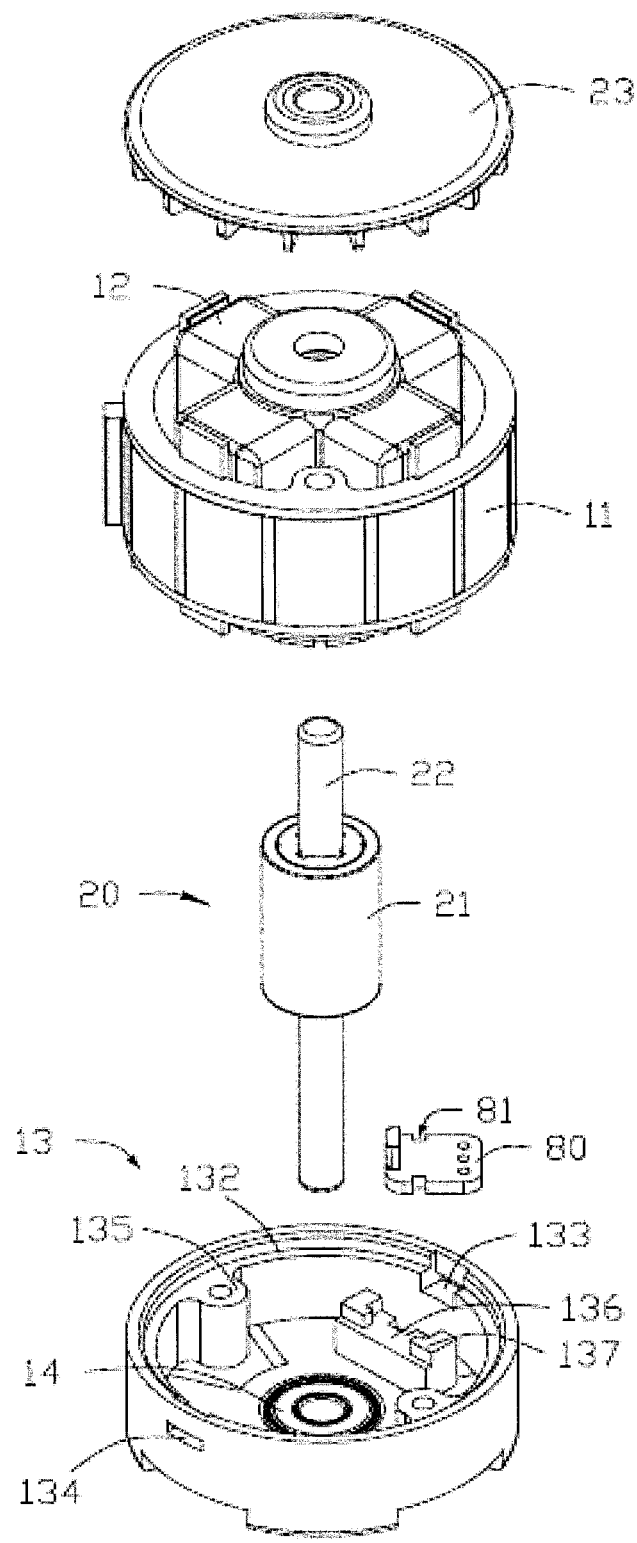
FIG. 2 is an exploded view of the motor of FIG. 1.
Figure 3:
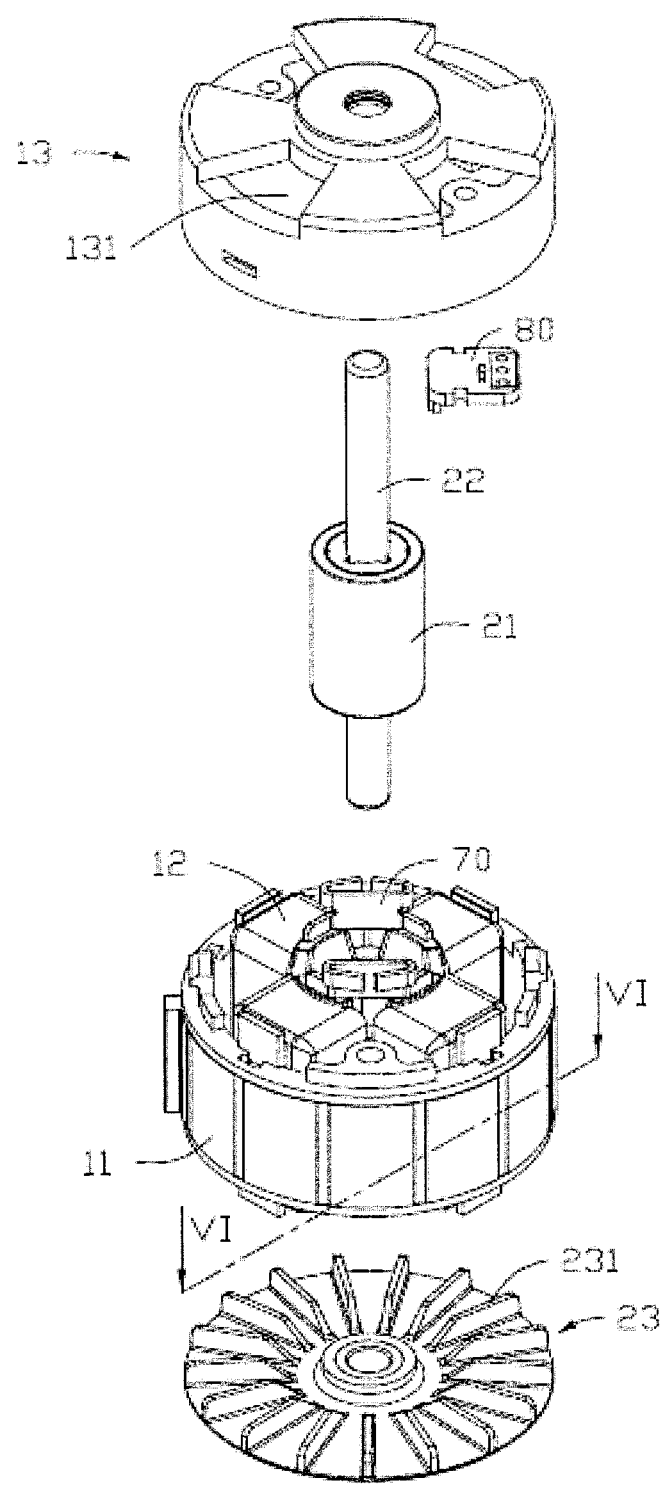
FIG. 3 is an exploded view of the motor of FIG. 1, viewed from another aspect.
Figure 4:
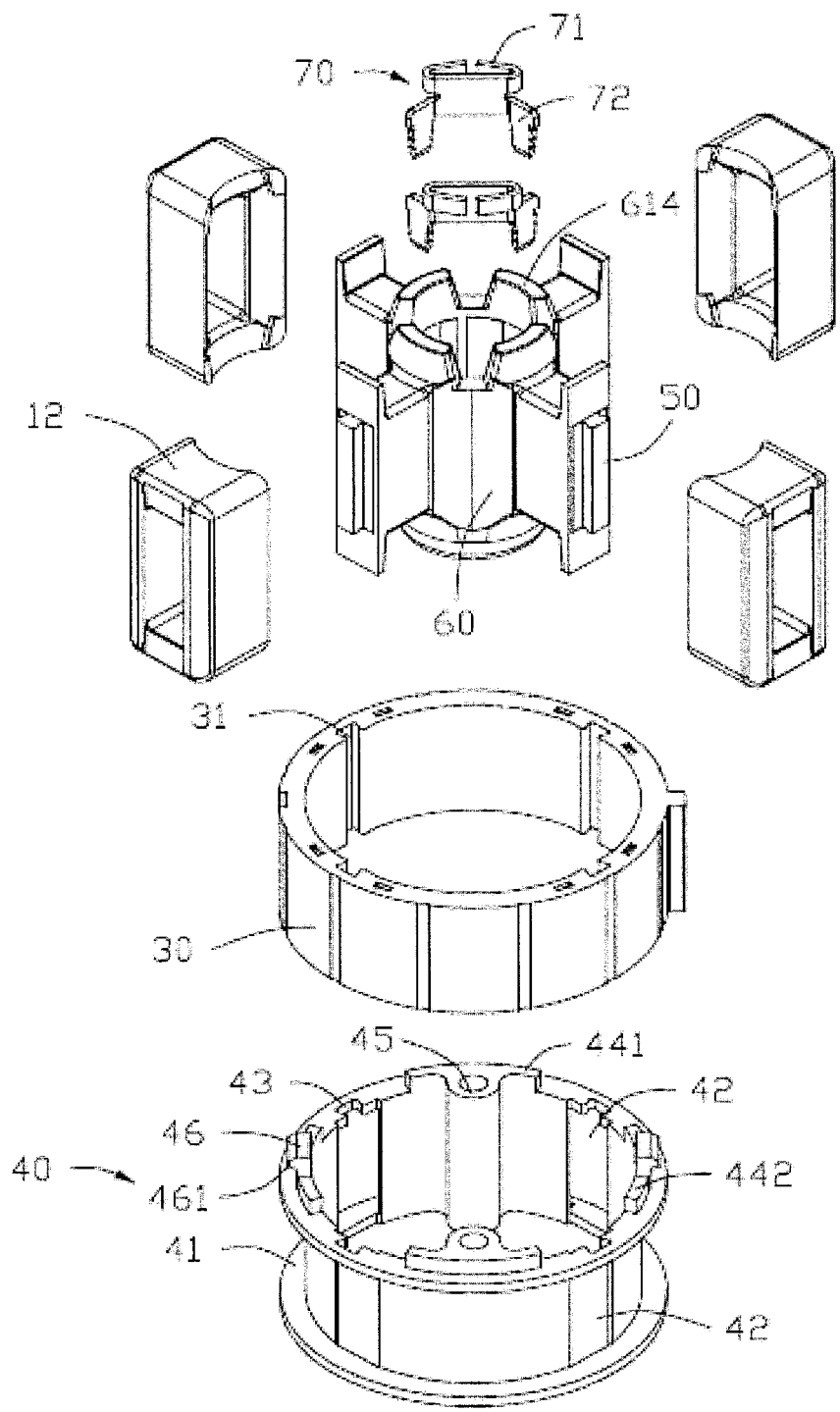
FIG. 4 is an exploded view of a stator core and stator windings of FIG. 3.

Referring to FIG. 2 and FIG. 3, the stator 10 includes a stator core 11, stator windings 12 wound around the stator core 11, and an end cap 13. Referring also to FIG. 4, the stator 10 further includes a mounting bracket 40 and a bobbin 60. The stator core 11 includes a stator yoke 30 and stator teeth 50. In this embodiment, the stator core 11 is illustrated as having four stator teeth 50. It is not intended to limit the number of the stator teeth 50 to any particular value and, in other embodiments, the number of the stator teeth 50 can vary depending on actual requirements.

Referring to FIG. 4, the stator yoke 30 is generally annular in shape. An inner surface of the stator yoke 30 is formed with four evenly spaced first engaging slots 31 each having an opening, such that the stator yoke 30 can be engagingly connected with the four stator teeth 50. Each first engaging slot 31 is a dovetail groove having a width progressively decreasing in a direction toward a center of the annular stator yoke 30. The first engaging slot 31 passes through two opposite ends of stator yoke 30 along an axial direction of the stator yoke 30.

The mounting bracket 40 is generally annular in shape. A circumferential outer surface of the mounting bracket 40 defines an annular groove 41. The annular groove 41 is used to receive the stator yoke 30 such that the stator yoke 30 is fixed to the mounting bracket 40. An inner surface of the mounting bracket 40 is formed with four evenly spaced receiving slots 42. Each receiving slot 42 passes through two opposite end surfaces of the mounting bracket 40 along an axial direction of the mounting bracket 40. The receiving slot 42 is in communication with the annular groove 41. The end surface of one end of the mounting bracket 40 defines four guiding notches 43 corresponding to the four first engaging slots 31. The guiding notch 43 and the first engaging slot 31 have the same shape, and the guiding notch 43 is in communication with both of the annular groove 41 and the receiving slot 42.

A plurality of arcuate positioning portions protrudes from the end surface of the mounting bracket 40 in which the guiding notches 43 are formed. In this embodiment, the mounting bracket 40 forms one first positioning portion 441 on that end surface. The first positioning portion 441 is disposed between two adjacent guiding notches 43. The mounting bracket further forms another first positioning portion 441 on that end surface, which is symmetrical with respect to the first positioning portion 441. The another first positioning portion 441 is disposed between another two adjacent guiding notches 43. The mounting bracket 40 further forms two second positioning portions 442 spaced from each other on that end surface, and one guiding notch 43 is disposed between the two second positioning portions 442 and the first positioning portion 441. The mounting bracket 40 further forms another two second positioning portions 442 on that end surface, which are symmetrical with respect to the two second positioning portions 442.

The inner surface of the mounting bracket 40 further includes first fixing portions 45 each having a through hole. Each first fixing portion 45 is generally cylindrical in shape, which extends along an axial direction of the mounting bracket 40. In this embodiment, the number of the first fixing portions 45 is two, and each first fixing portion 45 is disposed immediately adjacent one first positioning portion 441.

The mounting bracket 40 further forms latching portions 46 on the end surface in which the guiding notches 43 are faulted. A wedge-shaped hook 461 is formed at an outer side of a distal end of each latching portion 46. In this embodiment, the number of the latching portions 46 is two, with one latching portion 46 disposed between the two second positioning portions 442, and the other latching portion 46 disposed between the another two second positioning portions 442.

In this embodiment, the stator yoke 30 is formed by stacking a plurality of core laminations along an axial direction of the stator 10. In manufacturing and assembly, the core laminations are connected by riveting to form the stator core 30, and the mounting bracket 40 is formed using an over-molding process by injecting plastic or rubber around an outer circumferential surface of the stator core 30, with each first engaging slot 31 aligned with one corresponding guiding notch 43.

Figure 5:
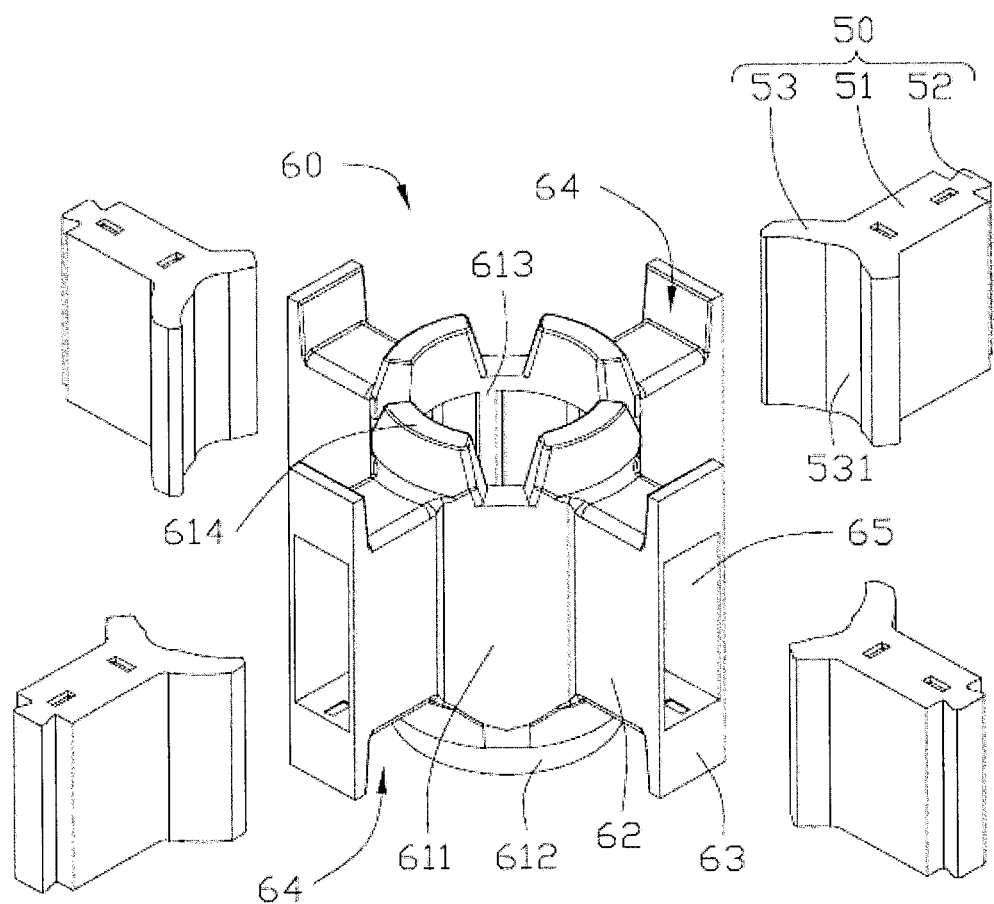
FIG. 5 is an exploded view of stator teeth and a bobbin of FIG. 3

Referring also to FIG. 5, each stator tooth 50 includes a tooth body 51, an engaging projection 52, and a pole shoe 53. The tooth body 51 is generally in the form of a g rectangular block, and the engaging projection 52 and the pole shoe 53 are disposed on two opposite ends of the tooth body 51, respectively. The engaging projection 52 is generally dovetail-shaped, which can pass through the guiding notch 43 to engage in the first engaging slot 31 such that the stator teeth 50 and the stator core 30 are engagingly connected.

In this embodiment, the motor 100 is a single-phase brushless motor. Each pole shoe 53 has a structure asymmetric about the corresponding tooth body 51, and a positioning groove 531 is formed in one side of the pole shoe 53 opposite from the corresponding tooth body 51. With the asymmetric pole shoe 53 and the positioning groove 531, the pole shoes 53 and a rotor core 21 form therebetween an even air gap, thus addressing the startup issue of the single-phase brushless motor 100.

The bobbin 60 includes a cylindrical portion 611 and a bottom 612. The cylindrical portion 611 and the bottom 612 cooperatively form a receiving chamber 613. One end of the cylindrical portion 612 opposite from the bottom 612 forms a plurality of arcuate protrusions 614. In this embodiment, the number of the protrusions 614 is four, and the four protrusions 614 are evenly spaced along a circumference of the cylindrical portion 611.

The bobbin 60 further includes a plurality of winding blocks 62 connected to an outer surface of the cylindrical portion 611 and a position-limiting plate 63 disposed at one end of each winding block 62 away from the cylindrical portion 611. Two ends of the position-limiting plate 63 protrude beyond the corresponding winding block 62. Both the winding block 62 and the corresponding position-limiting plate 63 are generally rectangular in shape, and the number of the winding blocks 62 and the position-limiting plates 63 are both four. One end of each position-limiting plate 63 and one corresponding winding block 62 and protrusion 614 cooperatively define a winding slot 64, and the other end of each position-limiting plate and the corresponding winding block 62 and protrusion 614 cooperatively define another winding slot 64.

Figure 6:
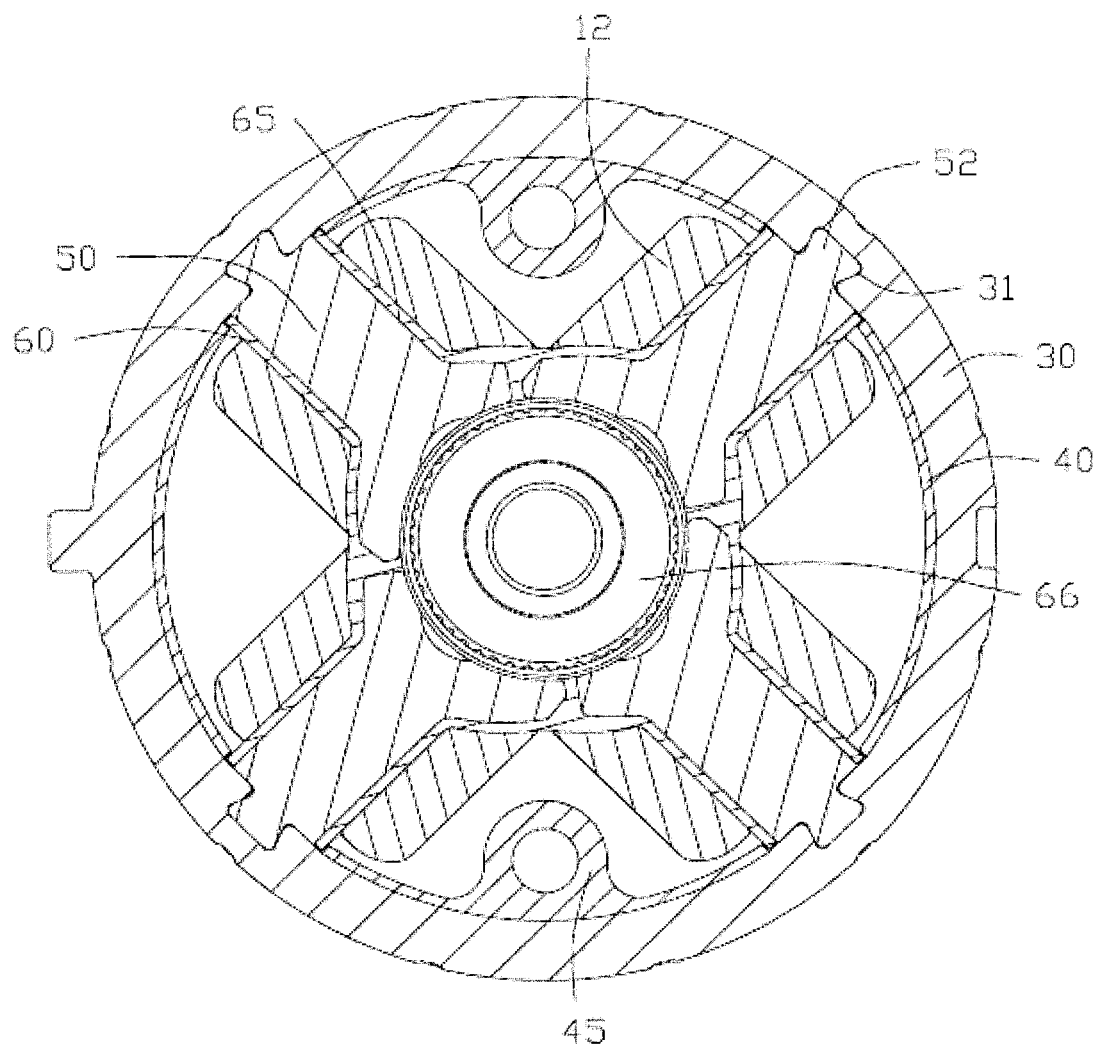
FIG. 6 is a sectional view of the stator core and stator windings of FIG. 3, taken along line VI-VI thereof.

Referring also to FIG. 6, the bobbin 60 defines a through slot 65 extending from an inner surface of the cylindrical portion 611 through each winding block 62 and the corresponding position-limiting plate 63. The through slot 65 has a shape substantially the same as the shape of the stator tooth 50. When one stator tooth 50 is received in one through slot 65, the pole shoe 53 of the stator tooth 50 engages the inner surface of the cylindrical portion 611 so as to cooperate with the rotor 20 received in the receiving chamber 613, and the engaging projection 52 of the stator tooth 50 is exposed out of the position-limiting plate 63 so as to engagingly connect with the stator yoke 30.

In this embodiment, each stator tooth 50 is formed by stacking a plurality of core laminations along an axial direction of the stator 10. In fabrication and assembly, the core laminations are connected by riveting to form the stator teeth 50, and the bobbin 60 is formed using an over-molding process by injecting plastic or rubber around outer circumferential surfaces of the stator teeth 50. The cylindrical portion 611, the winding blocks 62 and the position-limiting plates 63 are integrally formed. The stator teeth 50 are connected into an integrated unit through the bobbin 60. The bottom portion 612 of the bobbin 60 forms a receiving chamber close to a center of the bottom portion 612, and a bearing 66 is mounted in the receiving chamber (FIG. 6).

Four stator windings 12 are wound around the fourth winding blocks 62, respectively, and each stator winding 12 passes through the corresponding winding slot 64.

Referring again to FIG. 4, the stator 10 further includes terminals 70. Bent connecting portions 71 are symmetrically formed at two sides of one end of each terminal 70, for facilitating connecting the terminal 70 with the connecting lines of corresponding stator windings 12 to achieve electrical connection between various stator windings 12. Two sides of the other end of each terminal 70 are bent to form symmetrical inserting portions 72. The inserting portions 72 are generally conical in shape. In this embodiment, the number of the terminals 70 is two, and two sides of each inserting portions 72 of each terminal 70 are symmetrically formed with barbs 72. The two inserting portions 72 of one terminal 70 are inserted into two adjacent protrusions 614, and the two inserting portions 72 of another terminal 70 are inserted into another two adjacent protrusions 614.

It should be understood that the terminal 70 may be fixed to the corresponding protrusions 614 by connecting the inserting portions 72 with the corresponding protrusions 614 using an over-molding process. The provision of the barbs 721 prevents the terminal 70 from easily becoming disengaged from the protrusions 614.

It should be understood that the terminal 70 may be fixed to the corresponding protrusions 614 by locking connection or interference-fit between the inserting portions 72 and inserting holes (not shown) of the protrusions 614. The provision of the barbs 721 prevents the terminal 70 from easily becoming disengaged from the protrusions 614.

Referring again to FIG. 2 and FIG. 3, the end cap 13 includes a bottom plate and a sidewall. A plurality of ventilation holes 131 is formed in the bottom plate of the end cap 13, each extending from an edge toward a center of the bottom plate. A distal end of an inner surface of the sidewall of the end cap 13 defines an annular positioning slot 132, for facilitating engagement between the end cap 13 and the positioning portion 44 of the mounting bracket 40. The distal end of the inner surface of the sidewall of the end cap 13 defines receiving grooves 133 corresponding to the latching portions 46, and the sidewall of the end cap 13 further defines locking holes 134 each in communication with one corresponding receiving groove 133. The locking holes 134 are used to receive the hooks 461 of the latching portions 46 so as to fix the end cap 13 to the mounting bracket 40. The inner surface of the sidewall of the end cap 13 further forms second fixing portions 135 each having a through hole, corresponding to the first fixing portions 45. The end cap 13 and the mounting bracket 40 can be further fixed by sequentially passing fasteners (not shown) through the through holes of the second fixing portions 135 and the first fixing portions 45. In this embodiment, a bearing 14 is mounted in one side of the bottom plate of the end cap 13 toward the sidewall of the end cap 13.

In this embodiment, the motor 100 further includes a PCB 80. Position sensors such as switch type Hall sensors are formed on the PCB 80, for detecting a position of the rotor to thereby control the motor operation. Two opposite sides of the PCB 80 symmetrically form two locking notches 81. A boss 136 protrudes from an inner side of the bottom plate of the end cap 13. The boss 136 is generally rectangular in shape. An end surface of the boss 136 away from the bottom plate of the end cap 13 is symmetrically formed with two locking portions 137. Each locking portion 137 is generally L-shaped. One end of each locking portion 137 is engaged in a corresponding one of the two locking notches 81 of the PCB 80 so as to lock the PCB 80 in position. The PCB 80 is connected to an external controller through conducting wires, such that position signals detected by the position sensors are transmitted to the external controller to control electrical conduction manners of the stator windings 12, thus controlling rotation of the motor 100.

The rotor 20 includes a rotor core 21, a rotary shaft 22 and an impeller 23. The rotor core 21 is received in the receiving chamber 613 and includes a generally cylindrical-shaped permanent magnet, which forming a plurality of axially-arranged magnetic poles. The magnetic poles include N poles and S poles that are spaced from each other. The rotary shaft 22 and the rotor core 21 are coaxially arranged, with the rotary shaft 22 extending through and fixed relative to the rotor core 21. The impeller 23 has a generally circular disc shape, which is disposed at one side of the stator core 11 away from the end cap 13. One end surface of the impeller 23 toward the stator core 11 is formed with a plurality of vanes 231. The vanes 231 are arranged into a ring. One end of the rotary shaft 22 passes through the bearing 66 mounted in the bottom portion 612 and the bottom portion 612 to connect with the impeller 23. The other end of the rotary shaft 22 passes through the bearing 14 mounted in the bottom plate of the end cap 13 and the bottom plate of the end cap 13 to act as an output shaft for connecting with an external load. When the rotary shaft 22 is rotated, it drives the impeller 23 to rotate to effectively cool the motor 100.

Referring also to FIG. 6, in assembly, the bobbin 60 is formed using an over-molding process by injecting plastic or rubber around the outer circumferential surfaces of the four stator teeth 50 and the inserting portions 72 of the two terminals 70, with the stator teeth 50 received in the through slots 65, and the inserting portions 72 of the terminals 72 fixed in the protrusions 614 of the bobbin 60. Four stator windings 12 are wound around the four winding blocks 62, respectively, and the connecting lines (not shown) of the four stator windings 12 are connected to corresponding terminals 70. The mounting bracket 40 is formed using an over-molding process by injecting plastic or rubber around the outer circumferential surface of the stator yoke 30, the engaging projections 52 of the four stator teeth 50 pass through the guiding notches 43 to engage in the first engaging slots 31, respectively, and the position-limiting plates 63 are received in the receiving slots 42, such that the stator teeth 50, the bobbin 60, the stator windings 12 and the terminals 70 are fixed on the stator yoke 30. The rotor core 21 of the rotor 20 is received in the receiving chamber 613, with one end of the rotary shaft 22 passing through the bearing 66 mounted in the bottom plate 612 and the bottom plate 612 and connected to the impeller 23. The PCB 80 is mounted on the boss 136 of the end cap 13, with the other end of the rotary shaft 22 passing through the bearing 14 mounted on the bottom plate of the end cap 13 and the bottom plate of the end cap 13. Finally, the positioning groove 132 of the end cap 13 and the positioning portion of the mounting bracket are engaged so as to be positioned relative to each other, with the latching portions 46 received in the receiving grooves 133 and the hooks 461 engaging in the locking holes 134, the fasteners pass through the screw holes of the first fixing portions 45 and the second fixing portions 135 to fix the end cap 13 to the mounting bracket 40, and the assembly is thus accomplished.

In the motor of this embodiment, the stator yoke 30 and the stator teeth 50 are separately formed, and the bobbin 60 is formed using an over-molding process by injecting plastic or rubber around the outer circumferential surfaces of the stator teeth 50, such that multiple stator windings 12 can be simultaneously wound around the bobbin 60 at an outside of the stator yoke 30, which enhances the efficiency of winding the stator windings 12.

It should be understood that the protrusions 614 and the bottom portion 612 can be omitted. In this case, each of the two winding slots 64 is formed by the position-limiting plate 63, the winding block 62 and the cylindrical portion 611, and the terminal 70 can be connected to one end of the cylindrical portion 611 opposite from the bottom portion 612.

It should be understood that the position-limiting plates 63 and the receiving slots 42 may be omitted. In this case, the winding blocks 62 may directly abut against the inner surface of the mounting bracket 40.

It should be understood that the manner of connection between the end cap 13 and the mounting bracket 40 is not intended to be limited to those described in this embodiment, and the end cap 13 and the mounting bracket 40 can be connected in another manner, such as screw connection.

Figure 7:
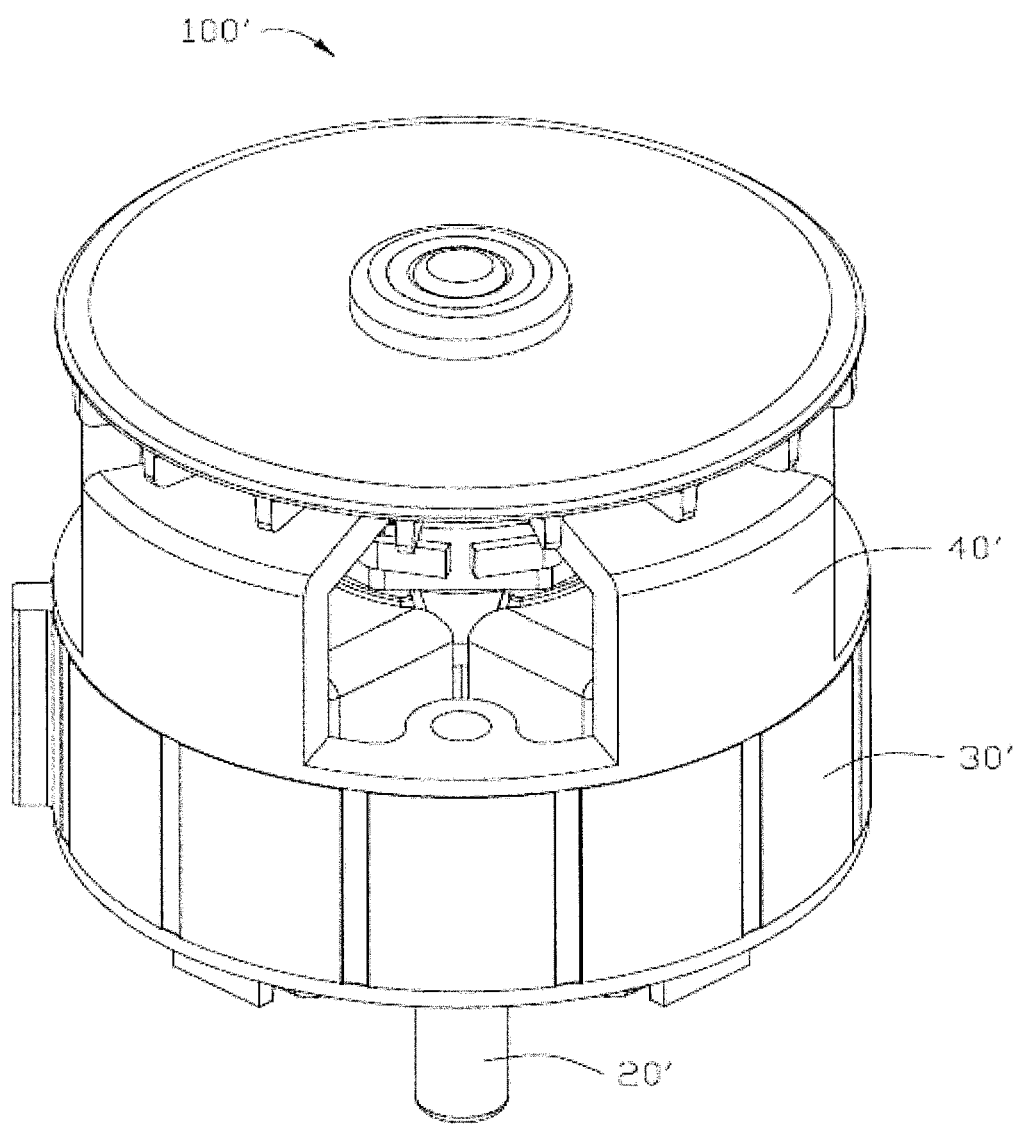
FIG. 7 is a perspective view of a motor according to a second embodiment of the present invention.
Figure 8:
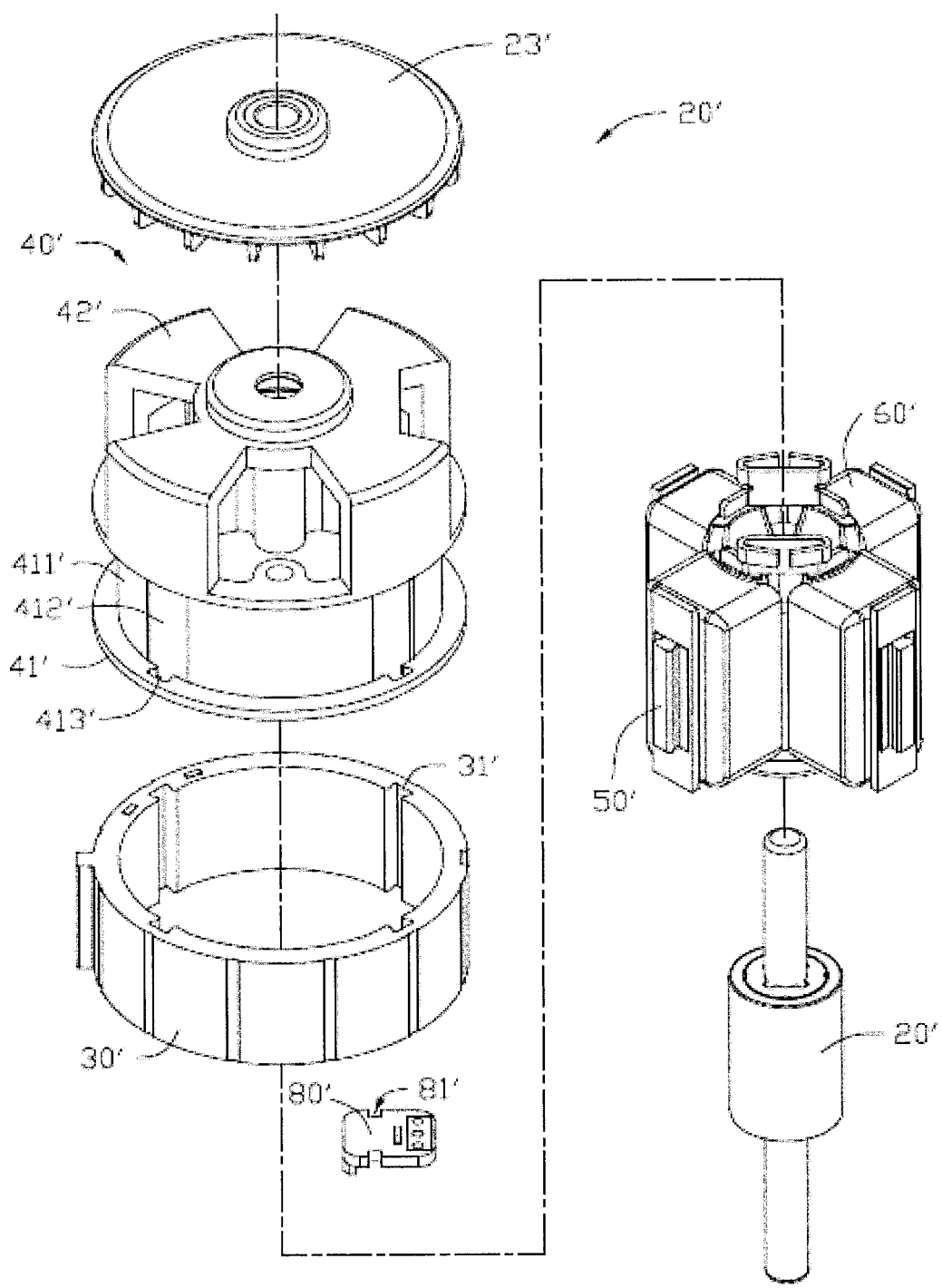
FIG. 8 is an exploded view of the motor of FIG. 7.

FIG. 7 and FIG. 8 illustrate a motor 100' according to a second embodiment of the present invention. The motor 100' includes a rotor 20', a stator yoke 30', stator teeth 50', a mounting bracket 60', and a PCB 80' that are the same as in the first embodiment, except that the motor 100' includes a mounting bracket 40' that is different in construction from the mounting bracket 40 of the first embodiment.

Figure 9:
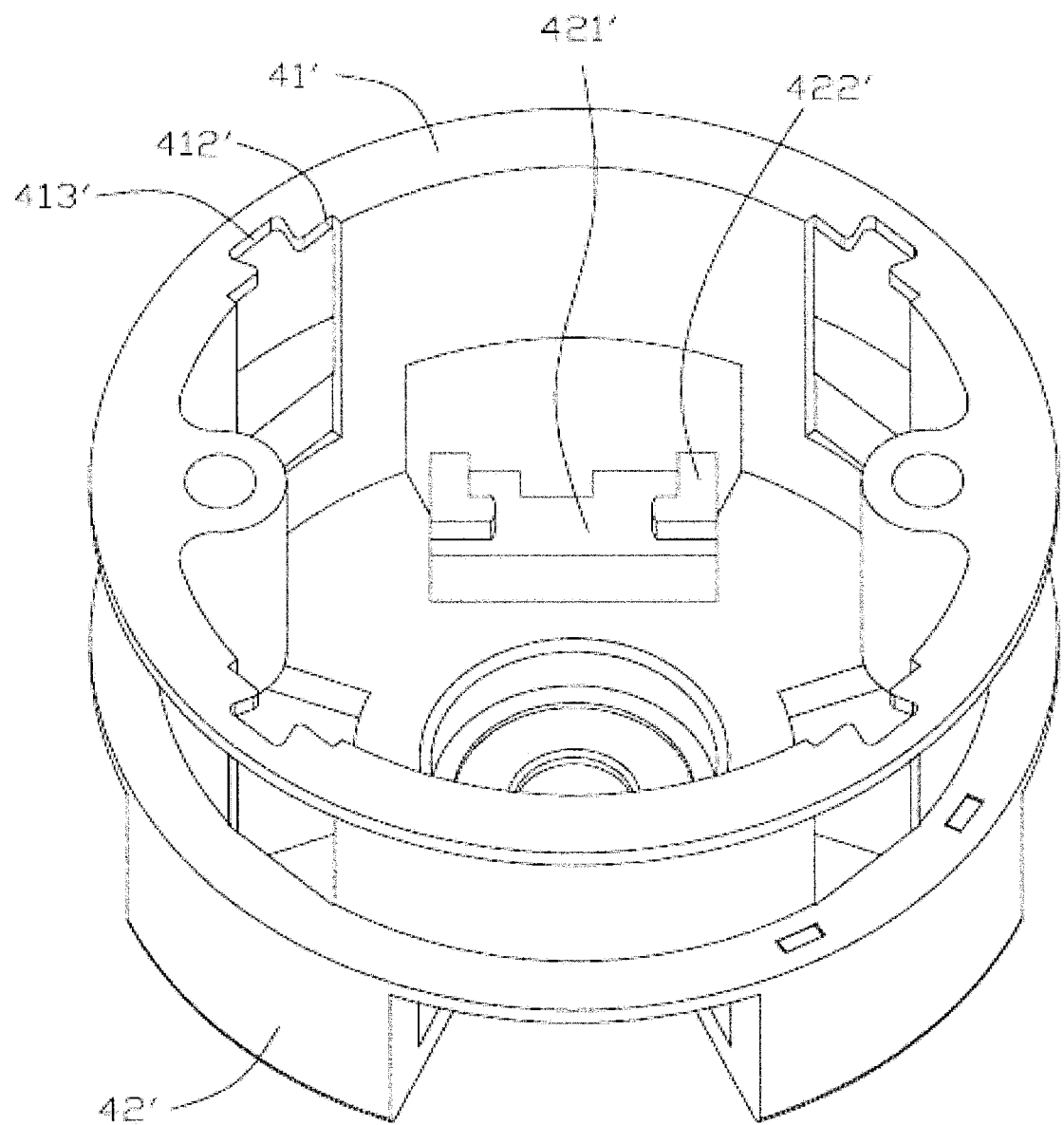
FIG. 9 is a perspective view of a mounting bracket of FIG. 8, viewed from another aspect.

Referring to FIG. 9, the mounting bracket 40' includes a mounting portion 41' and a receiving portion 42' at one end of the mounting portion 41'. The mounting portion 41' and the receiving portion 42' are integrally formed. The stator yoke 30' is mounted on the mounting portion 41', and the mounting bracket 40' is formed using an over-molding process by injecting plastic or rubber around the outer circumferential surface of the stator yoke 30'. The mounting portion 41' is generally annular in shape, an outer circumferential surface of which defines an annular groove 411'. The annular groove 411' is used to receive the stator yoke 30' such that the stator yoke 30' is fixed on the mounting bracket 40'. Four evenly spaced receiving slots 412' are defined in the inner surface of the mounting portion 41', the receiving slots 412' pass through the inner surface of the mounting portion 41' along an axial direction of the mounting portion 41', and the receiving slots 412' are in communication with the annular groove 411'. Four guiding notches 413' are defined in an inner side of one end of the mounting portion 41' away from the receiving portion 42', the guiding notch 413 and first engaging slot 31' have the same shape, and the guiding notch 413' is in communication with both of the annular groove 411' and the receiving slot 412'. The receiving portion 42' includes a bottom plate and a sidewall, and the bottom plate of the receiving portion 42' is disposed at a location away from the mounting portion 41'. A boss 421' protrudes from an inner side of the bottom plate of the receiving portion 42', and the boss 421' is generally rectangular in shape. An end surface of a distal end of the boss 421' is symmetrically formed with two locking portions 422'. Each locking portion 422' is generally L-shaped. One end of each locking portion 422' is engaged in a corresponding one of the two locking notches 81' of the PCB 80 so as to fix the PCB 80 relative to the mounting bracket 40'. A receiving chamber is defined in a center of the bottom plate of the receiving portion 42', and a bearing is mounted in the receiving chamber.

In the above embodiment, an impeller 23' is mounted in one side of the receiving portion away from the mounting portion 41'.

In the following, a method for making the stator according to one embodiment of the present invention is described.

A plurality of stator teeth 50 is firstly provided. Specifically, each of the stator teeth 50 is formed by stacking a plurality of core laminations along an axial direction of the stator.

A bobbin 60 is on the stator teeth 50 formed using an over-molding process. Specifically, the stator teeth 50 are placed in the same injection mold, and resin is injected into the mold to form the bobbin 60.

A plurality of stator windings 12 is wound around the bobbin 60.

A stator yoke 30 is provided. Specifically, the stator yoke 30 is formed by stacking a plurality of core laminations along an axial direction of the stator.

A mounting bracket 40 (40') is formed on the stator yoke 30 using an over-molding process.

The plurality of stator teeth 50 is assembled to the stator yoke 30.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A motor stator comprising:
    a stator core comprising a ring-like stator yoke and a plurality of stator teeth connected to an inner surface of the stator yoke;
    a bobbin wrapping the stator teeth with an over-molding process, and
    a plurality of stator windings correspondingly wound around the stator teeth of the stator core via the bobbin;
    wherein the bobbin comprises a cylindrical portion and a plurality of winding blocks, each sleeving on a correspondingly one of the stator teeth, the winding blocks extend from an outer side of the cylindrical portion, each of the stator teeth comprises a tooth body and a pole shoe connected to one end of the tooth body opposite from the stator yoke, each of the stator windings is wound around a corresponding one of the winding blocks;
    wherein the bobbin further comprises a bottom portion connected to one end of the cylindrical portion, a receiving chamber is formed in a center of the bottom portion, and a bearing is mounted in the receiving chamber.

2. The motor stator of claim 1, wherein each of the pole shoes has a structure asymmetric about a corresponding tooth body, one side of the pole shoe opposite from the corresponding tooth body defines a positioning groove, and the stator is used in a single-phase brushless motor.

3. The motor stator of claim 1, wherein the cylindrical portion and the winding blocks of the bobbin are integrally formed, and the stator teeth are connected into an integrated unit through the bobbin.

4. The motor stator of claim 1, wherein the bobbin further comprises a position-limiting plate disposed at one end of each of the winding blocks away from the cylindrical portion, two ends of the position-limiting plate both protrude out of the winding block, and each end of the position-limiting plate, the winding block and the cylindrical portion cooperatively bounding a winding slot for a corresponding one of windings.

5. The motor stator of claim 1, wherein each of the stator teeth has a lamination-stacking structure.

6. The motor stator of claim 1, wherein the stator yoke has a lamination-stacking structure.

7. The motor stator of claim 1, wherein an inner surface of the stator yoke defines a plurality of first engaging slots, each of the first engaging slot passes through two opposite ends of stator yoke along an axial direction of the stator yoke, each of the stator teeth includes an engaging projection disposed at one end of the tooth body opposite from the pole shoe, and each of the engaging projections engages in a corresponding one of the first engaging slots.

8. The motor stator of claim 7, wherein the stator further comprises a mounting bracket, an annular groove is defined in a circumferential side of the mounting bracket configured to receiving the stator yoke, one of opposite axial end of the mounting bracket defines a plurality guiding notches in communication with the annular groove, and respectively aligning with the first engaging slot to enable each of the engaging projections passes through one corresponding guiding notch to engage in one corresponding first engaging slot.

9. The motor stator of claim 8, wherein a plurality of receiving slots is defined in a circumferential wall bounding the annular groove, to respectively communicating with the guiding notches, the bobbin further comprises a position-limiting plate disposed at one side of each of the winding blocks away from the cylindrical portion, and each position-limiting plate is received in one corresponding receiving slot.

10. The motor stator of claim 8, wherein the stator further comprises an end cap, the end cap comprises a bottom plate and a sidewall, and the end cap is connected to an end of the mounting bracket, a bearing is mounted to the bottom plate of the end cap.

11. The motor stator of claim 10, wherein the mounting bracket comprises a latching portion, a hook is formed at a distal end of the latching portion, the sidewall of the end cap defines a receiving groove to receive the latching portion and a locking hole in communication with the receiving groove and configured to engage with hook.

12. The motor stator of claim 10, wherein the bottom plate of the end cap defines a plurality of ventilation holes.

13. The motor stator of claim 10, wherein a PCB is mounted in the end cap and fixed to an inner side of the bottom plate of the end cap.

14. The motor stator of claim 7, wherein the stator further comprises a mounting bracket, the mounting bracket comprises an mounting portion wrapping the stator yoke with an over-molding process and a receiving portion is integrally formed with and extending from one of opposite axial ends of the mounting portion, a bearing and a PCB is mounted in the receiving portion.

15. The motor stator of claim 14, wherein an annular groove is defined in a circumferential side of the mounting portion configured to receiving the stator yoke, the other one of the opposite axial ends of the mounting portion of the mounting bracket defines a plurality guiding notches in communication with the annular groove, and respectively aligning with the first engaging slot to enable each of the engaging projections passes through one corresponding guiding notch to engage in one corresponding first engaging slot.

16. The motor stator of claim 1, wherein the stator further includes a plurality of terminals attached to an end of the cylindrical portion, and configured to electrically connecting with corresponding stator windings.

17. The motor stator of claim 16, wherein the end of the cylindrical portion to which the terminals is attached forms a plurality of circumferentially spaced protrusions, each of the terminals are engaged between adjacent protrusions.

18. A motor comprising:
a motor stator, the motor stator comprising:
a stator core comprising a ring-like stator yoke and a plurality of stator teeth connected to an inner surface of the stator yoke;
a bobbin wrapping the stator teeth and forming with an over-molding process; and
a plurality of stator windings correspondingly wound around the stator teeth of the stator core via the bobbin; and
a rotor, the rotor comprising:
a rotor core received in the bobbin and in magnetic coupling with the stator teeth; and
a rotary shaft fixed relative to the rotor core;
wherein the bobbin comprises a cylindrical portion and a plurality of winding blocks, each sleeving on a correspondingly one of the stator teeth, the winding blocks extend from an outer side of the cylindrical portion, each of the stator teeth comprises a tooth body and a pole shoe connected to one end of the tooth body opposite from the stator yoke, each of the stator windings is wound around a corresponding one of the winding blocks;
wherein the bobbin further comprises a bottom portion connected to one end of the cylindrical portion, a receiving chamber is formed in a center of the bottom portion, and a bearing is mounted in the receiving chamber.

19. The motor of claim 18, wherein the rotor further comprises an impeller connected with one end of the rotary shaft, and the impeller includes a plate plurality of vanes depending on one side of the plate facing the stator.

* * * * *